Apr. 24, 1923.

E. H. PIPE 1,452,702

STUCCO MIXING MACHINE

Filed June 28, 1920

Inventor
Edward H.
Pipe

By Frank E.
Laraure Jr.
Attorney

Apr. 24, 1923.

E. H. PIPE 1,452,702

STUCCO MIXING MACHINE

Filed June 28, 1920    4 Sheets-Sheet 3

Inventor
Edward H. Pipe
By Frank E. Lunance, Jr.
Attorney

Apr. 24, 1923.

E. H. PIPE 1,452,702

STUCCO MIXING MACHINE

Filed June 28, 1920    4 Sheets-Sheet 4

Inventor
Edward H. Pipe
By Frank E. Liunauce, Jr.
Attorney

Patented Apr. 24, 1923.

1,452,702

UNITED STATES PATENT OFFICE.

EDWARD H. PIPE, OF ST. LOUIS, MISSOURI, ASSIGNOR TO ACME CEMENT PLASTER COMPANY, OF ST. LOUIS, MISSOURI, A CORPORATION OF ILLINOIS.

STUCCO-MIXING MACHINE.

Application filed June 28, 1920. Serial No. 392,510.

*To all whom it may concern:*

Be it known that I, EDWARD H. PIPE, a citizen of the United States of America, residing at St. Louis, in the county of St. Louis and State of Missouri, have invented certain new and useful Improvements in Stucco-Mixing Machines; and I do hereby declare the following to be a full, clear, and exact description of the invention, such as will enable others skilled in the art to which it appertains to make and use the same.

This invention relates to a mixing machine particularly useful in the mixing of what is known as "stucco" and delivering it to forms for making building blocks, the mixed stucco and water entering the forms in a plastic state and setting and hardening therein to solid form after which the blocks may be removed from the forms and the same again used for further making of blocks. The block form and the machine used in conjunction therewith have each been the subject matter of previous applications for patent resulting in Patents Nos. 1,314,018 and 1,337,618, issued respectively, August 26, 1919, and April 20, 1920. In the quantity production of the building blocks, it is necessary to have a plurality of the forms and of the machines used therewith in use and supply properly mixed stucco and water to the forms at intervals. The present invention has for its primary object and purpose, the provision of a portable mixing machine into which stucco and water in measured amounts may be introduced and thoroughly mixed and which also includes in its structure a means for moving the machine along suitable carrying tracks either to a point to receive the stucco or to receive the water, or to any of the plurality of forms for delivery of the mixture thereto. Further objects of the invention are to provide the machine with many novel constructive details and arrangements of parts for effectively attaining the ends above noted in a practical and fully operative manner.

For an understanding of the invention, reference may be had to the following description taken in connection with the accompanying drawings, in which, Fig. 1 is a side elevation with parts broken away and shown in section, illustrating the mixing machine and its operative relation to the forms used in making blocks.

Like reference characters refer to like parts in the different figures of the drawings.

Figure 1:
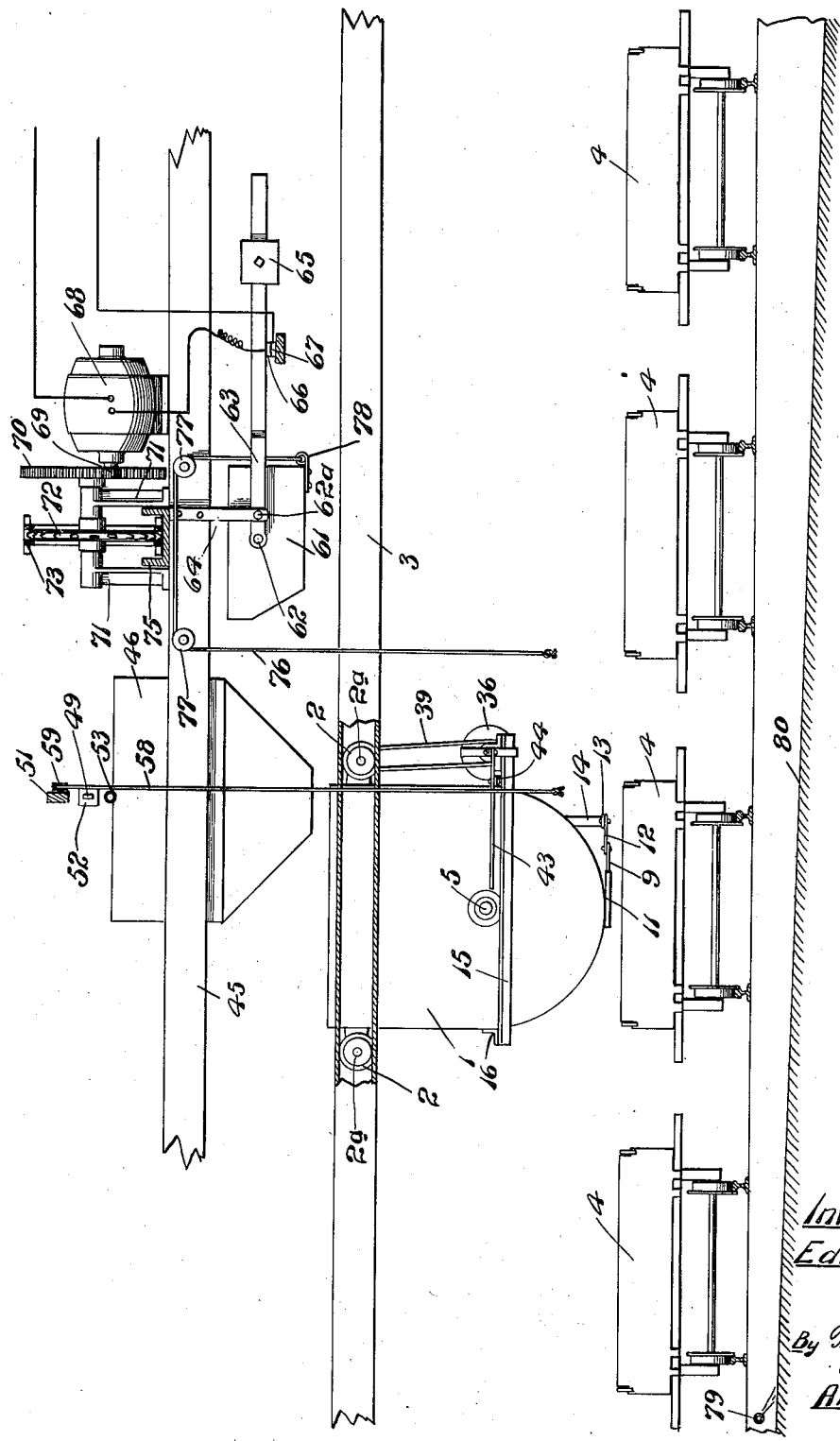
Figure 2:
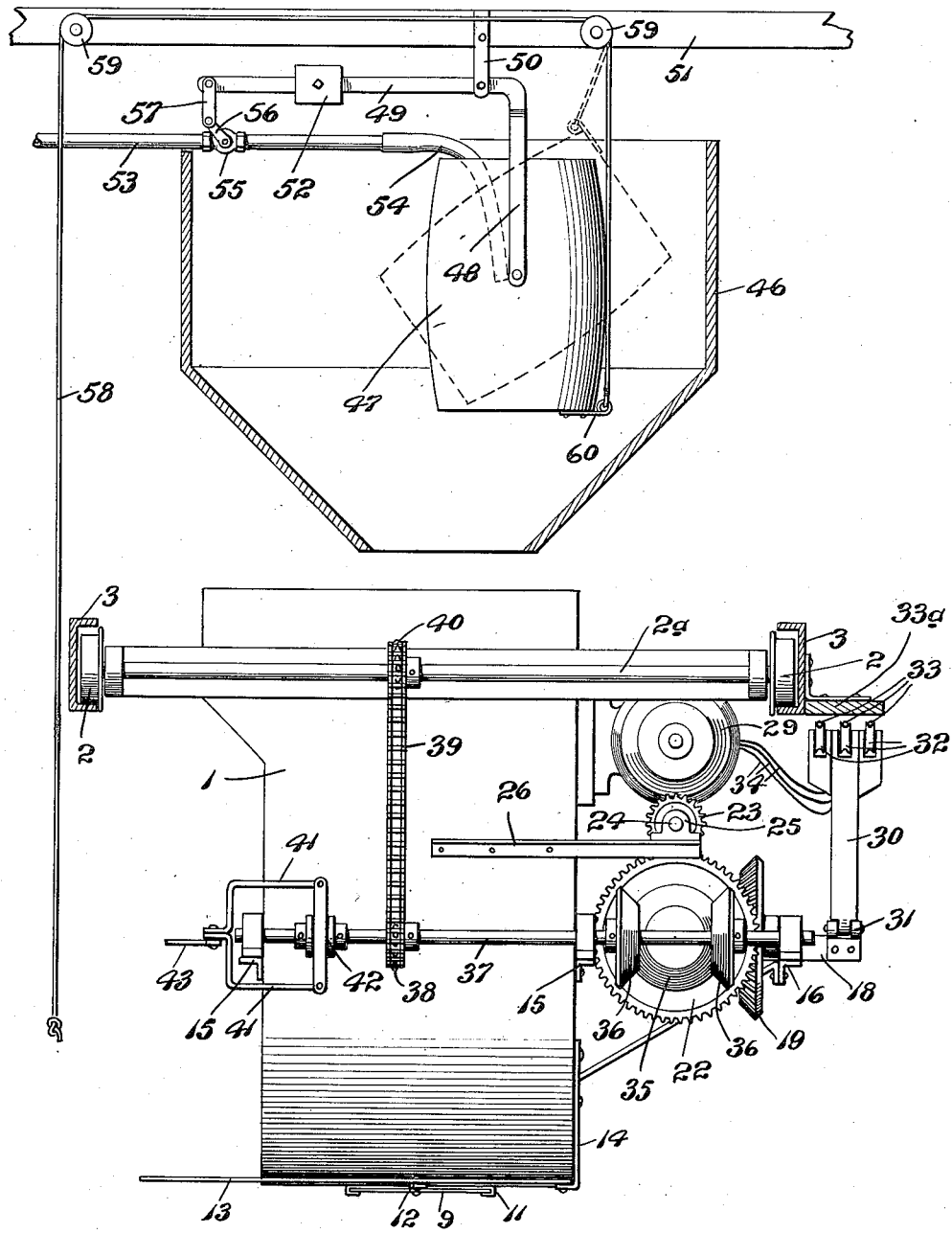
Fig. 2 is an end elevation of the mixing machine, the carrying tracks therefor being in section and the water weighing apparatus being shown above the machine.

In the construction of the machine, a mixing housing or receptacle 1, open at its upper side is mounted for movement on wheels 2 carried at the ends of cross shafts 2ª between channel tracks 3 which may be supported in the building in which the plant is installed in any suitable manner. This housing extends below the tracks and its lower end passes above the upper sides of forms made in accordance with the disclosure of the Patent No. 1,314,018 above noted. The forms 4 are spaced apart and mounted on tracks for ready movement when desired.

A shaft 5 is mounted at its ends in the sides of the receptacle. Arms 6 extend in opposite directions from the shaft adjacent the sides of the receptacle and are connected at their outer ends by cross bars 7. When the shaft is rotated said bars 7 serve as mixing paddles for thoroughly mixing water and stucco entered into the receptacle. A discharge slot 8 is cut in the lower end of the receptacle. A plate 9 with a similar slot 10 therein is slidably mounted in and between guides 11 so as to pass under slot 8 and when the slots are in conjunction the mixed material in the mixer may be delivered, the same flowing by gravity through the slots to any of the forms 4 over which the mixer may be positioned. A link 12 is attached at one end to plate 9 and at its opposite end to a lever 13 which is pivotally connected at one end to the lower end of a post 14 attached to and depending from the receptacle 1. The link 12 is connected to lever 13 at a point between its ends, and the free end of said lever is formed into a handle for grasping by the hand to manually operate the same and move the slide 9 to or away from discharge position.

Figure 4:
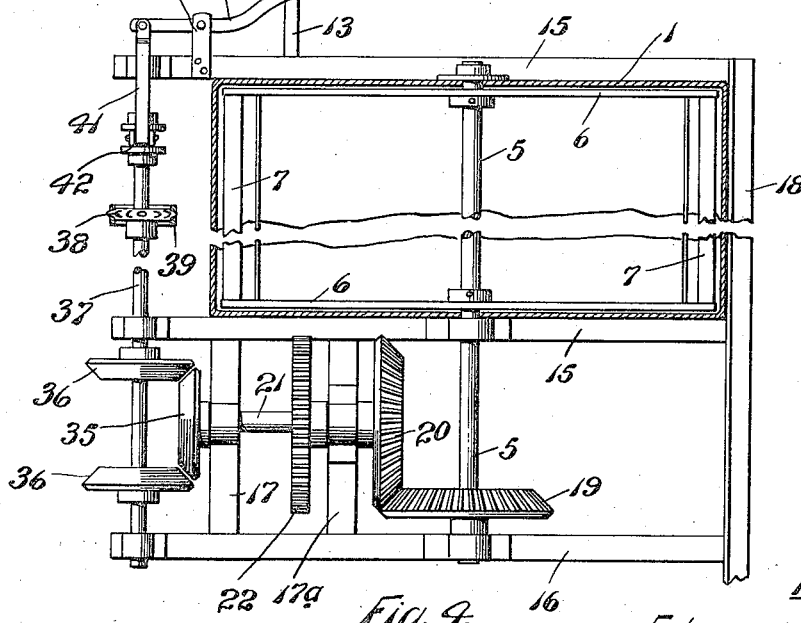
Fig. 4 is a horizontal section and plan taken substantially on the line 4—4 of Fig. 3.

Two angle bars 15 are secured on opposite sides of the receptacle immediately below the ends of shaft 5. Another bar 16 is spaced from and parallels one of the bars 15, as shown in Fig. 4, being rigidly connected to the same by cross bars 17 and an angle bar 18 which extends across one end of the receptacle 1 as shown. The shaft 5 extends to the outer bar 16 and at its end is received in a bearing carried on said bar.

A bevelled gear 19 is fixed on shaft 5, being in engagement with a second gear 20 fixed at the end of a short shaft 21 rotatably mounted in bearings carried on cross bars 17. A gear 22 on shaft 21 is driven by a pinion 23 secured on a shaft 24 disposed horizontally a distance above the shaft 21 and mounted at its ends in bearings 25 carried on angle bars 26 attached to the ends of the receptacle 1 and projecting a distance laterally beyond said receptacle. A gear 27 on shaft 24 is driven by a pinion 28 on the shaft of a motor 29 which is fastened on a side of the receptacle. It is evident that whenever the motor is running, the mixing paddles 7 within the receptacle are continuously moving.

Figure 3:
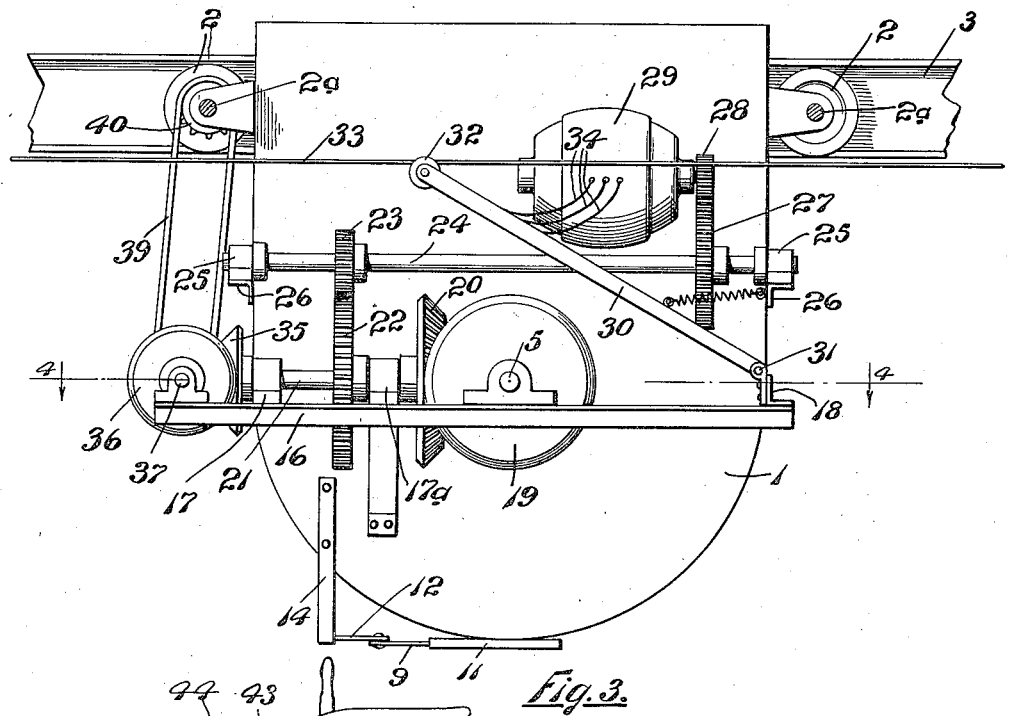
Fig. 3 is an enlarged side elevation of the mixing machine looking from the side thereof opposite to that shown in Fig. 1.

A trolley pole 30 is pivotally connected at 31 at its lower end to the bar 18 on which a plurality of trolley wheels 32 are mounted at its upper end to run against trolley wires 33 passing below a guard shoe 33ª attached to one of the carrying tracks 3. Wires 34 lead from the wheels 32 to the motor. A spring is disposed between the pole 30 and bar 18 to hold the wheels against the wires as shown in Fig. 3.

A friction wheel 35 is secured to the end of shaft 21 between two similar wheels 36 fixed on a shaft 37 which is rotatably as well as slidably mounted in bearings at the ends of the bars 15 and 16 as shown in Fig. 4. Shaft 37 is equipped with a sprocket wheel 38 around which a driving belt or chain 39 passes, the same also going around a sprocket wheel 40 secured on one of the cross shafts 2ª. Arms 41 are attached operatively with a collar 42 on the shaft 37 and are adapted to be operated by a lever 43 pivotally connected to said arms, the lever having pivotal connection between its ends to a supporting bracket 44 secured to one of the bars 15. By operating lever 43, either friction wheel 36 may be brought into frictional contact with the friction drive wheel 35, the shaft 37 having freedom of longitudinal movement permitting this, whereby said shaft may be driven in either direction at will with a consequent driving of the cross shaft 2ª to carry the mixing machine along tracks 3; and the direction of movement thereof will depend upon which wheel 36 is brought into engagement with the driving wheel 35 as is obvious. It is also evident that at an intermediate point, neither wheel 36 is in engagement with wheel 35 and no movement of the mixing machine on the tracks takes place when the friction wheels are thus positioned.

Supporting beams 45 are located above the tracks 3 on which a hopper 46 having downwardly and inwardly inclined bottom portions is mounted, the hopper having an opening in its lower side directly over the upper open end of the receptacle 1 when the mixing machine is moved to bring the same below the hopper. A barrel 47 is tiltably suspended between arms 48 forming a fork and turned downwardly from a horizontal bar 49 pivotally suspended from a bracket 50 which in turn is supported from an overhead beam or bar 51. A weight 52 is adjustably mounted on the bar 49. It will be noted that the point of pivotal suspension of bar 49 is between the weight and the centre of gravity of the barrel so that in effect a weighing appliance is made. A water pipe 53 extends over the hopper 46 and has a hose 54 attached at the end and leading into the barrel. A valve 55 is interposed in the length of the pipe having an arm 56 connected thereto which is connected by a link 57 with the end of the bar 49. When the barrel is empty the weight 52 overbalances the barrel and arm 56 is moved to open valve 55 causing the water to flow into the barrel until such time as the weight 52 is overbalanced with a consequent elevation of the end of bar 49 and a cutting off of the water through closing valve 55. The barrel may be tilted to dump the water by pulling on the cable 58 which leads from a point within easy reach over guide pulleys 59 and to a connection 60 attached to the bottom of the barrel. The water is kept from splashing over the machine by the hopper, the barrel being wholly enclosed thereby. The mixing machine is brought directly below the hopper before the barrel is dumped so that all of the water goes into the receptacle 1. After dumping, the cable 58 is released and the barrel automatically rights itself, is again filled with a measured quantity of water after which the water is cut off, the procedure being indefinitely repeated in the working of the machine.

Figure 5:
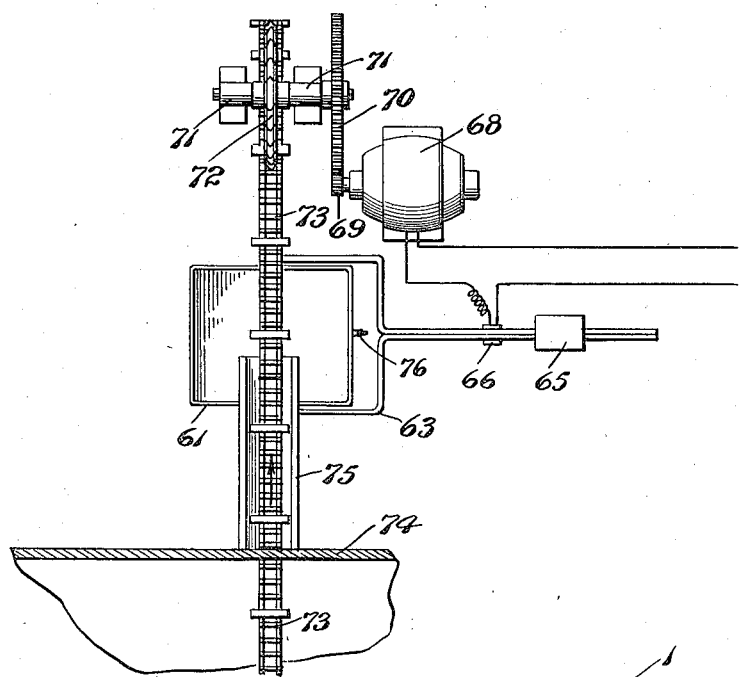
Fig. 5 is a fragmentary plan illustrating the mechanism used for conveying stucco to the stucco hopper and for automatically stopping the same when a predetermined weight of stucco has been delivered into the hopper.
Figure 7:
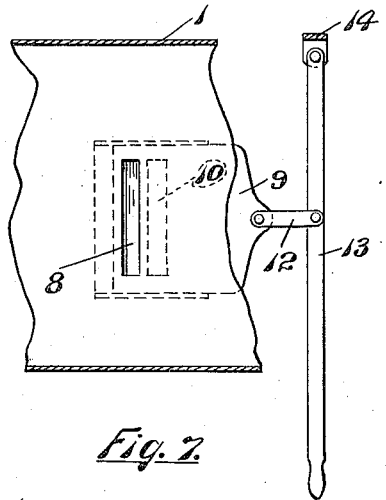
Fig. 7 is a fragmentary section and plan substantially on line 7—7 of Fig. 6.
Figure 6:
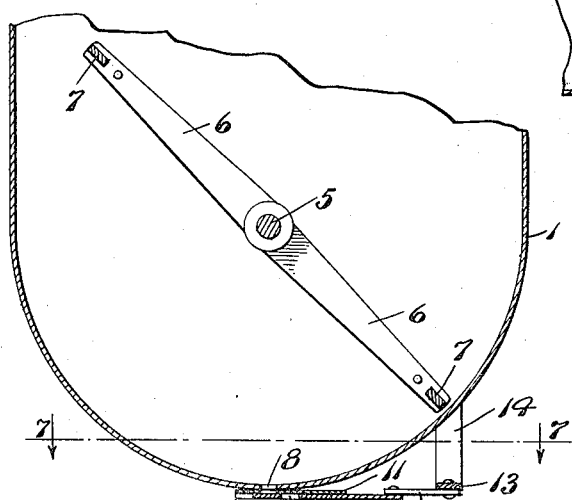
Fig. 6 is a fragmentary vertical section through the lower part of the mixer showing the discharge control apparatus.

The stucco is delivered into the mixing receptacle from a container 61 which is pivotally mounted at 62 to and between forked arms of a bar 63 which in turn is pivotally suspended at 62ª from bars 64 connected to the overhead beams 45. Bar 63 is also equipped with a weight 65 which when the container 61 is empty overbalances the same and depresses the outer free end of the bar bringing an electrical contact 66 carried by the bar into contact engagement with a second electrical contact 67 below the first contact, said contact being disposed in an electrical circuit in which a motor 68 is located. The engagement of the contacts closes the circuit and starts the motor. A pinion 69 is secured on the motor shaft and meshes with a gear 70 fixed on the end of a shaft mounted in bearings at the upper ends of brackets 71, the same being supported on the beam 45. A sprocket wheel 72 is fixed on said shaft around which an endless conveyor chain 73 passes. This conveyor chain leads to a bin 74 in which the supply of stucco is stored and the lower run of the chain traverses a trough 75 leading from the bin to above the open upper side of the container 61 as best shown in Fig. 5. When a desired quantity of stucco has been conveyed from the bin to the container, the weight thereof serves to elevate the free end bar 63 with a consequent breaking of contact between the contacts 66 and 67, stopping of the motor 68 and stoppage of the passage of stucco to the container. The container is dumped by pulling on the depending end of cable 76 which leads over pulleys 77 on beam 45 and to a connection 78 at the bottom and one end of the container as shown in Fig. 1.

From the foregoing it is apparent that a practical mixing machine and plant for the quantity production of blocks made from cementitious material is disclosed and one in which a thorough mixing of the stucco and water may be had together with an easy delivery of the cementitious mixture to forms positioned to receive it. The water barrel and the stucco container are always filled and ready for dumping into the mixing receptacle whenever it is moved in position to receive said water and stucco. The movements of the mixing container along the tracks is very easily controlled by a simple operation of the lever 43. The mixing of the material within the mixing receptacle is complete and thorough. The delivery to any form 4 is readily controlled by a simple actuation of the lever 13. Any slight excess of mixed stucco and water which may overflow from a form being filled is washed away by water discharging from pipe 79 and running along gutter 80 under the forms as shown in Fig. 1. With four of the forms, by the time all have been filled with the cementitious material, the first one has had its material set hard enough for handling so that the blocks may be removed and carried away for further setting and drying. This construction of mixing machine and block making plant has been in practical operation for a considerable time and is working continuously with substantially perfect operation. If at any time the mixing is to be stopped it is merely necessary to throw the switch so as to stop the current supply to the trolley wires 33. It is apparent that many changes in the mechanical construction may be made without varying the invention and I, accordingly, do not wish to be limited to the disclosure made, but consider myself entitled to all constructions coming within the scope of the appended claims defining the invention.

I claim:

1. A mixing machine comprising a receptacle open at its upper end, tracks one at each side of the upper part of the receptacle between which said receptacle is located and below which it depends, cross rods connected one at each end of the receptacle, rollers on the ends of the rods running on the tracks, a shaft extending through the receptacle parallel to and below the rods, mixing members attached to the shaft, means for driving the shaft, and means for driving one of said cross rods in either direction from said shaft, substantially as described.

2. A mixing machine comprising a receptacle open at its upper end, tracks one at each side of the upper part of the receptacle, cross shafts one at each end of the receptacle, wheels on the ends of the cross shafts running on the tracks, a mixing shaft passing through the receptacle, mixing members on said mixing shaft, an electric motor carried by the receptacle, wires paralleling the tracks, a trolley carried by the receptacle and running on the wires, electrical connections between the motor and trolley, means interposed between the motor and mixing shaft for driving the latter continuously from the former, and means for driving one of said cross shafts from the motor in either direction, substantially as described.

3. In a mixing machine, a receptacle open at its upper end, tracks one at each side of the upper part of the receptacle, means for movably suspending the receptacle on said tracks, a shaft passing through the receptacle, mixing members thereon, an electric motor carried by the receptacle, means to drive the shaft therefrom, and means for moving the receptacle in either direction lengthwise of the tracks, substantially as described.

4. In a mixing machine, a receptacle open at its upper end, tracks one at each side of the upper part of the receptacle, means for movably suspending the receptacle on said tracks, a shaft passing through the receptacle, mixing members thereon, an electric motor carried by the receptacle, means to drive the shaft therefrom, means for moving the shaft in either direction over the tracks, and manually controlled means for reversing the direction of travel of the receptacle with respect to the tracks, substantially as described.

5. In combination, a mixing machine including a receptacle open at its upper end, tracks from which said receptacle is suspended and on which it is mounted for movement to different positions, means for moving the receptacle to different positions, mixing members in the receptacle, means for operating the same, a bar formed with a downturned fork pivotally mounted between its ends above the tracks, a barrel pivotally suspended from the fork, a weight on the bar adjacent the opposite end, a water pipe leading to the barrel, a valve having a valve arm interposed in the length of the pipe, a link connecting the arm and end of the bar, and means to turn the barrel about its pivotal axis of mounting to dump the contents thereof into the receptacle, substantially as described.

In testimony whereof I affix my signature.

EDWARD H. PIPE.